US012607721B2

(12) United States Patent　(10) Patent No.:　US 12,607,721 B2

Menzel et al.　(45) Date of Patent:　Apr. 21, 2026

(54) OPTOELECTRONIC SENSOR

(71) Applicant: SICK AG, Waldkirch (DE)

(72) Inventors: Christoph Menzel, Denzlingen (DE);
Frederick Böckling, Freiburg (DE);
Dominic Ruh, Freiburg (DE)

(73) Assignee: SICK AG, Waldkirch (DE)

( * ) Notice: Subject to any disclaimer, the term of this
patent is extended or adjusted under 35
U.S.C. 154(b) by 737 days.

(21) Appl. No.: 18/110,020

(22) Filed: Feb. 15, 2023

(65) Prior Publication Data

US 2023/0258775 A1　Aug. 17, 2023

(30) Foreign Application Priority Data

Feb. 16, 2022　(EP) ..................................... 22157102

(51) Int. Cl.
　*G01S 7/481*　(2006.01)
　*G01S 17/34*　(2020.01)
　*G02B 6/35*　(2006.01)

(52) U.S. Cl.
　CPC ............ *G01S 7/4815* (2013.01); *G01S 17/34*
　(2020.01); *G02B 6/3598* (2013.01)

(58) Field of Classification Search
　None
　See application file for complete search history.

(56) References Cited

U.S. PATENT DOCUMENTS

| | | | |
|---|---|---|---|
| 11,002,857 B2 | 5/2021 | Dussan et al. | |
| 2008/0151264 A1* | 6/2008 | Spencer | G01S 7/497 |
| | | | 702/159 |

| | | | |
|---|---|---|---|
| 2018/0267250 A1* | 9/2018 | Hosseini | G02B 6/3556 |
| 2018/0284226 A1 | 10/2018 | LaChapelle et al. | |
| 2018/0284234 A1 | 10/2018 | Curatu | |
| 2018/0302611 A1* | 10/2018 | Baak | G01S 7/4808 |
| 2019/0377135 A1 | 12/2019 | Mansouri Rad et al. | |

(Continued)

FOREIGN PATENT DOCUMENTS

| | | | |
|---|---|---|---|
| DE | 102020110142 A1 | 10/2021 | |
| EP | 3832344 A1 | 6/2021 | |
| EP | 3916424 A1 | 12/2021 | |

OTHER PUBLICATIONS

European Search Report issued on Aug. 5, 2022 for application No. EP22157102.9.

*Primary Examiner* — Eric L Bolda

(74) *Attorney, Agent, or Firm* — Nath, Goldberg & Meyer; Jerald L. Meyer

(57)　ABSTRACT

An optoelectronic sensor includes a plurality of light sources for generating transmission light, including at least a first and a second light source. The optoelectronic sensor includes transmission optics for projecting transmission light into the field of view and at least one detector for detecting transmission light reflected by the object. A photonic network has a plurality of irradiation points to each of which transmission light, in particular in each case of exactly one light source, can be supplied. The transmission light exits into the transmission optics and ultimately exits into the field of view. A plurality of irradiation points that are arranged directly next to one another or that are directly adjacent are in this respect configured to irradiate transmission light into partial fields of view, in particular different partial fields of view and/or a plurality of partial fields of view arranged next to one another or are adjacent.

23 Claims, 2 Drawing Sheets

(56)     References Cited

U.S. PATENT DOCUMENTS

Figures 3, 4:

2021/0018603  A1     1/2021  Lu et al.
2021/0103199  A1*    4/2021  Wu ........................ G01S 7/4818
2021/0255324  A1     8/2021  Dunn et al.

* cited by examiner

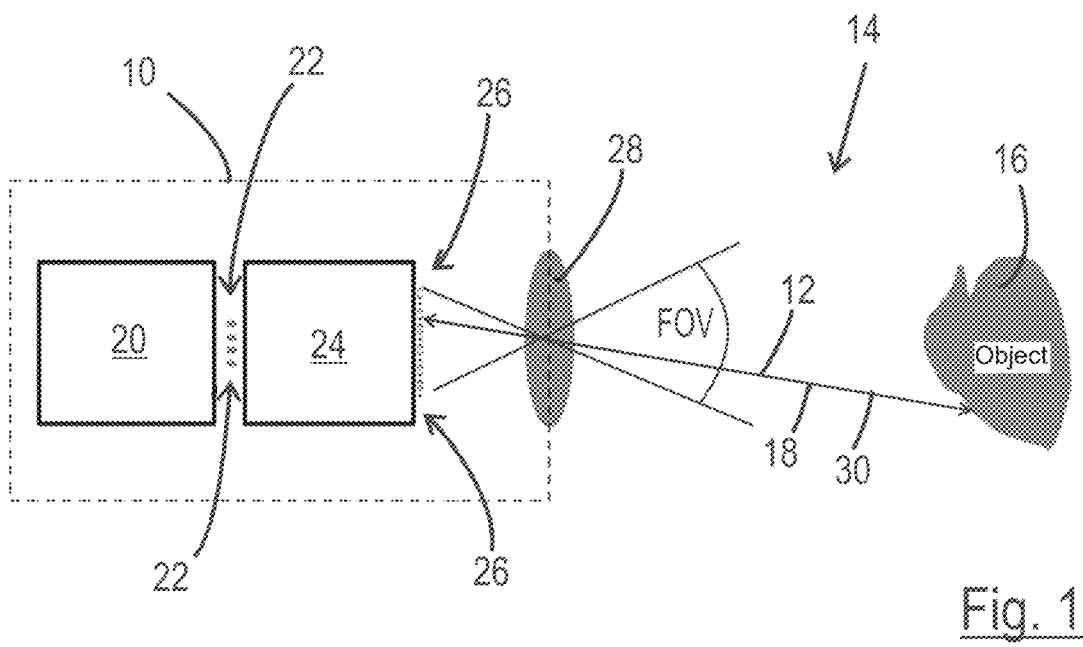
_Fig. 1_
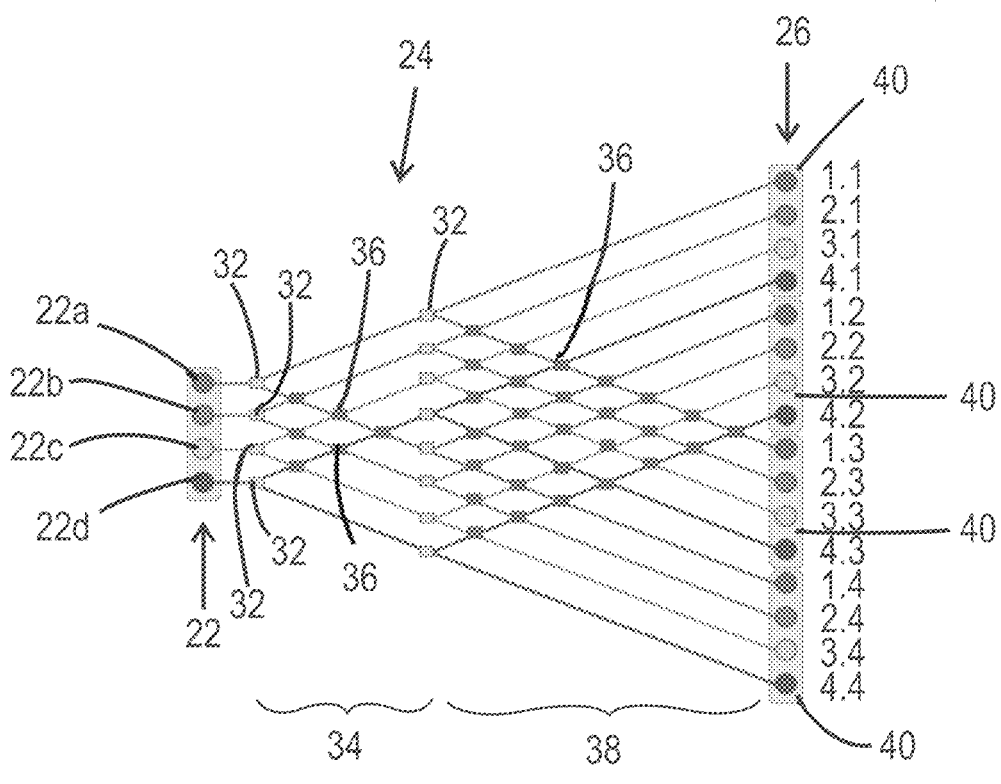
_Fig. 2_

OPTOELECTRONIC SENSOR

The present invention relates to an optoelectronic sensor for detecting an object in a field of view of the sensor. The optoelectronic sensor comprises a plurality of light sources for generating transmission light. Furthermore, the optoelectronic sensor comprises a transmission optics for projecting transmission light into the field of view and at least one detector for detecting transmission light reflected by the object. The light sources emit transmission light to a photonic network. The photonic network has a plurality of irradiation points from each of which transmission light exits or to each of which the transmission light can be supplied. A plurality of irradiation points that are disposed directly next to one another or that are directly adjacent are in this respect configured to irradiate transmission light into partial fields of view that are disposed directly next to one another or that are directly adjacent. The photonic network is configured to supply, in particular to selectively supply, transmission light of the same light source to at least two different irradiation points.

Such optoelectronic sensors are generally known, wherein these sensors, for example, operate in accordance with the sensing principle in which a light beam is transmitted into the field of view of the sensor and the light beam reflected by the object is received again in order to evaluate the reflected light beam. In this respect, the time of flight is, for example, measured using a known phase method or pulse method to determine the distance of the object. This method is also called LIDAR (Light Detection And Ranging).

Such optoelectronic sensors are, for example, known from DE 10 2020 110 142 A1 or EP 3 916 424 A1. In the known sensors, different light sources, which are, for example, each part of an FMCW system, can each have one light source optically switched to directly adjacent irradiation points. Each light source can thus scan a contiguous but spatially greatly restricted section of the field of view.

If there is no object in the section of the field of view of a light source, that light source cannot obtain any data about the object. The light source is then temporarily "useless".

It is therefore the underlying object of the invention to specify an optoelectronic sensor that enables an improved data acquisition.

This object is satisfied by an optoelectronic sensor in accordance with claim 1.

The optoelectronic sensor in accordance with the invention comprises a plurality of light sources for generating transmission light, wherein the light sources comprise at least a first and a second light source. Furthermore, the optoelectronic sensor comprises a transmission optics for projecting transmission light into the field of view and at least one detector for detecting transmission light reflected by the object. The light sources emit transmission light to a photonic network. The photonic network has a plurality of irradiation points to each of which transmission light, in particular in each case of exactly one light source, can be supplied, preferably by the photonic network, wherein the transmission light preferably exits from the irradiation points, possibly exits into the transmission optics, and in particular ultimately exits into the field of view. A plurality of irradiation points that are arranged directly next to one another or that are directly adjacent are in this respect configured to irradiate transmission light into partial fields of view, in particular different partial fields of view and/or a plurality of partial fields of view, that are arranged next to one another or that are adjacent. The adjacent partial fields of view can preferably be arranged directly next to one another. The photonic network is in this respect configured to supply, in particular to selectively supply, transmission light of the same light source to at least two different irradiation points.

The optoelectronic sensor in accordance with the invention is characterized in that, between the two different irradiation points to which transmission light of the first light source can be supplied, at least one irradiation point is arranged to which transmission light of the second light source can be supplied.

Since at least one irradiation point, which is associated with the second light source, is arranged between two different irradiation points that are associated with the first light source, it is possible to scan a first partial field of view with the first light source and to scan a directly adjacent second partial field of view with the second light source. A third partial field of view, which directly adjoins the second partial field of view with respect to the first partial field of view, can then be scanned by the first light source or a further light source. Consequently, it is possible to scan a contiguous section of the field of view with different light sources. For an object in this section of the field of view, scans can therefore be simultaneously performed with a plurality of light sources, whereby additional information about the object can be acquired and the data acquisition about the object is thus consequently improved. Furthermore, the speed of the data acquisition can be increased since the different light sources (and thus, for example, different FMCW channels) can be used in parallel for the scan of a section of the field of view.

In accordance with the invention, a plurality of light sources for generating transmission light are provided. The transmission light first enters the photonic network from the light sources and is supplied by the photonic network to the irradiation points, wherein in particular the transmission light of a light source is at least substantially supplied to exactly one irradiation point. The transmission light can then exit from the photonic network at the irradiation points and can possibly enter the transmission optics. The transmission optics can also be part of the irradiation points. Ultimately, the transmission light is irradiated into the field of view and can be incident on the object there that remits, i.e. reflects, the transmission light. The reflected transmission light is detected by the detector, whereby the distance between the optoelectronic sensor and the object can, for example, be detected based on the time of flight of the transmission light. The reflected transmission light can in particular enter the photonic network again at the irradiation points, can be conducted through the photonic network on the same light paths as the transmission light, and can be guided to the detector in this way.

The irradiation points can be arranged and/or configured such that the transmission light of a respective irradiation point is irradiated in a spatial direction covered only by the respective irradiation point. In this way, the irradiation points can irradiate transmission light into a plurality of partial fields of view, in particular different partial fields of view, that are arranged next to one another or that are adjacent, preferably arranged directly next to one another or directly adjacent. For each irradiation point, it is thus clear into which partial field of view this irradiation point emits transmission light. Together with the distance of the object, the position of the object relative to the optoelectronic sensor can thus be determined. For this purpose, the optoelectronic sensor can, for example, have a control device that controls the light sources and the photonic network and that evaluates the reflected transmission light detected by the detector.

The partial fields of view are in particular separate from one another and/or overlap only with the partial fields of view that are directly adjacent or that are arranged directly next to one another. A partial field of view can e.g. comprise a predetermined angular range in the plane (for a two-dimensional field of view) or a predetermined spatial angular range (for a three-dimensional field of view). The angular range can e.g. span 1°, 2°, or 5°.

Since, between the two irradiation points to which transmission light of the first light source can be supplied, at least one irradiation point is arranged to which transmission light of the second light source can be supplied, it results for the angular range or spatial angular range that can be irradiated by the first and/or second light source that this angular range or spatial angular range is non-contiguous. In general, each angular range or spatial angular range that can be irradiated by the same light source of the optoelectronic sensor can be non-contiguous.

The light sources can in particular be lasers.

Advantageous further developments of the invention can be seen from the description, from the Figures, and from the dependent claims.

In accordance with a first embodiment, the photonic network comprises at least one optical switch for each light source, wherein the respective switch is configured to feed transmission light to at least two different light paths in the photonic network in particular in order to supply transmission light, preferably selectively, to at least two different irradiation points. Due to the optical switch or the optical switches, the transmission light of the first light source can e.g. be selectively supplied to a first or second irradiation point associated with the first light source. Due to the switch, different angles or spatial angles, i.e. different partial fields of view, can thus be scanned with the first light source.

In accordance with a further advantageous embodiment, the photonic network comprises at least one waveguide intersection to supply transmission light of the second light source to an irradiation point that is disposed between the two different irradiation points to which transmission light of the first light source can be supplied. The waveguide intersection can therefore be used to supply the transmission light of the second light source to an irradiation point that is disposed between two irradiation points that are associated with the first light source. A waveguide intersection can in particular be required when the photonic network is arranged in a plane, for example, on a circuit board or a wafer. The waveguide intersection can, for example, have two inputs and two outputs that are arranged in the shape of a cross and/or that are arranged diagonally with respect to one another. At a point of intersection of the waveguide intersection, an overlay region can be provided through which both transmission light of the first input and transmission light of the second input are guided. In the overlay region, transmission light of two different light sources can thus be superposed, wherein the transmission light of at least substantially only one light source exits from a respective one of the outputs.

Alternatively to such a planar arrangement, it is also possible to implement a waveguide intersection, for example, by way of two light guides that are spatially disposed above one another, that intersect, but that are separate from one another (e.g. separate optical fibers). The light guides that are separate from one another can, for example, comprise so-called "photonic wirebonds" in which light guides are three-dimensionally written into a photosensitive resist by exposure. The photosensitive resist can be developed after the exposure and can be removed except for the resulting light guides. Two light guides that are spatially disposed above one another, that intersect, but that are separate from one another can likewise e.g. be achieved by two circuit boards or wafers arranged above one another, wherein a circuit board or a wafer is arranged upside down ("flip chip bonding"). The transmission light of one light source can in this respect only extend in one of the circuit boards/wafers, whereas the transmission light of another light source is first guided in a first circuit board/wafer and is then transferred into the second circuit board/wafer to effect the intersection of the transmission light. After the intersection, the transmission light is then returned into the first circuit board/wafer again.

When an input or an output is spoken of herein, it usually refers to the direction of the transmission light, i.e. to the direction from the light source to the object. For reflected transmission light, one output can then be considered as an input and one input can be considered as an output e.g. of a switch or of a waveguide intersection.

As mentioned, the photonic network can be arranged in a plane, for example, on a circuit board/wafer. The photonic network preferably does not comprise any movable parts, in particular for the optical switch or the optical switches and/or the waveguide intersection(s). The optical switch can, for example, have one input, in particular a single input, that is connected to the light source. The optical switch can furthermore comprise two outputs that are each connected with one light path to two different irradiation points. The light paths can end in the irradiation points. The switches can e.g. be controlled via electro-optical mechanisms or thermo-optical mechanisms. Alternatively or additionally, the switches can be plasmonic-photonic switches or photonic crystal switches. The switches can be configured to each supply a major portion or the greater part (e.g. 50%, 70%, 80%, or 90%) of the energy of the transmission light to a single one of the outputs.

An optical switch can, for example, have two adjacent optical fibers between which an electric field can be designed by applying a voltage. If light is coupled in at the input of the switch (i.e. at the input of the first fiber) and a voltage is applied, the light is then transmitted to the second fiber and can be decoupled at the end of the second fiber. If no voltage is applied, the light remains in the first fiber and can be guided in the first fiber, for example, up to an irradiation point and can be decoupled there. Typical switching frequencies of such optical switches are in the range from 0.5 to 5 Mhz so that a fast scanning of the field of view over different partial fields of view is possible. Alternatively or additionally, optical switches can also be implemented mechanically, for example, by means of micromirrors. The optical switches can be manufactured in MEMS (Micro-Electro-Mechanical Systems) technology for this purpose.

The waveguide intersections, in contrast, cannot have a switching effect.

In accordance with a further embodiment, the sensor comprises at least three, four or more than four light sources, wherein, between two different irradiation points to which transmission light of the same light source can be supplied, an irradiation point is in each case arranged for each other light source, to which irradiation point transmission light of one of the other light sources can be supplied. The supply, made possible by the waveguide intersection, of transmission light of another light source to an irradiation point that is disposed between two irradiation points of the same light source is equally possible for larger numbers of light sources. Consequently, the disclosure regarding the first and second light source applies accordingly to larger numbers of light sources.

In accordance with a further embodiment, the photonic network has a photonic integrated circuit that in particular has the optical switch and the waveguide intersection. The photonic integrated circuit can also be designated as a PIC (Photonic Integrated Circuit). The photonic network can have a plurality of switches and waveguide intersections to thus selectively supply transmission light of the light sources to a plurality of irradiation points. The irradiation points can be part of the photonic integrated circuit.

In accordance with a further embodiment, the irradiation points are arranged along a straight line. Alternatively, at least the majority of the irradiation points are arranged along a straight line. The arrangement along the straight line can in particular be part of the photonic integrated circuit. The irradiation points can be arranged disposed next to one another in a plane, for example, directly at an edge of the circuit board or of the wafer of the photonic integrated circuit. Likewise, the light sources or at least coupling-in points for the light sources into the photonic network can be arranged next to one another in a plane. The necessity of one or more waveguide intersections results from the arrangement in the plane.

In accordance with an alternative embodiment, at least some of the irradiation points are arranged along a curved, elliptical, or circular path that, for example, extends around a lens center of a lens of the transmission optics. In this embodiment, an edge of the circuit board or of the wafer can be formed in a curved, elliptical, or circular manner with the irradiation points disposed at the edge.

In accordance with a further embodiment, the optoelectronic sensor has a group of irradiation points arranged directly next to one another, wherein the number of irradiation points in the group corresponds to the number of light sources, wherein transmission light of another light source can be supplied to each of the irradiation points in the group. A group can accordingly be a number of irradiation points arranged directly next to one another. Transmission light of another light source can be supplied, in particular simultaneously supplied, to each of the irradiation points in the group. This means that it is possible with the irradiation points of a group to irradiate, in particular to simultaneously irradiate, transmission light into the partial fields of view arranged directly next to one another and thus to scan these partial fields of view.

As shown in more detail later in FIG. 2, four light sources and four groups can, for example, be provided. The first light source can then be selectively connected to an irradiation point in the first group, to an irradiation point in the second group, to a further irradiation point in the third group, and finally to an irradiation point in the fourth group. The same applies to the second to fourth light source. In this way, four groups with a respective four irradiation points result. As many irradiation points as there are remaining light sources are preferably disposed between two irradiation points to which transmission light of the same light source can be supplied. Transmission light of exactly one of the remaining light sources can be supplied to each of the irradiation points disposed therebetween.

In accordance with a further embodiment, a plurality of groups, in particular identical or similar groups, are arranged following one another. The irradiation points of different groups can thus be arranged behind one another along the line, in particular the straight line. The irradiation points, to which transmission light of different light sources can be supplied, can thus be arranged in an alternating manner. Together, the groups can cover the entire field of view of the sensor, i.e. the irradiation points of the groups and thus the partial fields of view of the groups cover the entire field of view of the sensor. Due to the alternating arrangement of the irradiation points, each light source can thus irradiate transmission light in completely different directions of the field of view.

In accordance with a further embodiment, some of the irradiation points are configured to irradiate transmission light into partial fields of view arranged more closely next to one another than the remaining irradiation points or some of the remaining irradiation points. Partial fields of view arranged closely to one another can, for example, be achieved by irradiation points arranged more closely to one another. A plurality of, e.g. centrally arranged, irradiation points can in particular have a smaller spacing from the respective directly adjacent irradiation points than e.g. peripherally arranged irradiation points. Generally speaking, not all the irradiation points can be arranged equidistant from the respective directly adjacent irradiation points. In this way, a central region can e.g. be scanned with a higher resolution, whereas marginal regions can only be scanned with a lower resolution.

In accordance with a further embodiment, the optoelectronic sensor is configured to supply transmission light to some of the irradiation points for a longer period of time than to other irradiation points to which transmission light is supplied. Due to the longer period of time of the supply of transmission light, a greater range can e.g. be achieved. Such a greater range can be advantageous in automotive applications in order e.g. to scan that part of the field of view that corresponds to the horizon with a greater range.

The more closely arranged irradiation points and/or partial fields of view mentioned above can also be directed towards the horizon so that, in addition to the increased range, an increased resolution can also be achieved in this region. The region of the horizon is usually the most relevant for automotive applications.

In accordance with a further embodiment, the photonic network comprises a first stage having optical switches and waveguide intersections, wherein the optical switches each have one input and two outputs, wherein the outputs of each switch, in particular all of them, are connected to a plurality of waveguide intersections so that the outputs of one switch intersect at least one output of each other switch once.

The inputs of the optical switches of the first switch can each be coupled, preferably directly coupled, to a light source. Due to the respective optical switch, the transmission light of the light source can then be supplied to two different light paths to finally reach at least two different irradiation points. In order, for example, to achieve an alternating arrangement of the irradiation points, waveguide intersections are again provided, wherein the waveguide intersections are arranged such that the outputs or light paths of one switch intersect at least one output or light path of each other switch once. Thus, the first stage in particular comprises twice as many outputs as inputs.

In accordance with a further embodiment, the photonic network comprises a second and/or one or more further stages having optical switches and waveguide intersections, wherein the optical switches each have one input and two outputs, wherein the outputs of each switch, in particular all of them, are connected to a plurality of waveguide intersections so that the outputs of one switch intersect at least one output of each other switch once, wherein a respective optical switch of the second and/or further stage(s) is provided for an output of the previous stage. The outputs of the previous stage can therefore be coupled, preferably directly coupled, to a respective optical switch of the second or further stages. The outputs or output paths of the last stage can then supply the transmission light to the irradiation points. For the second and each further stage, it again applies that, in order to provide alternating irradiation points, the outputs or output paths of each switch intersect at least one output path of each other switch of this stage once, as is shown later in FIG. 2.

For each stage, the number of irradiation points to which transmission light can be supplied thus in particular doubles.

It is also possible to use further switches instead of waveguide intersections, wherein the further switches—like the waveguide intersections—can have two inputs and two outputs. The waveguide intersections could therefore be replaced by such switches. In this case, it would be possible to selectively switch each light source to each irradiation point. Thus, each light source could generally scan each partial field of view.

As mentioned, the optoelectronic sensor can be configured for an optical distance measurement. Each light source can in particular be associated with an individual measurement channel so that one distance value each can be determined with each light source.

In accordance with a further embodiment, each light source is part of an FMCW system, in particular in each case a single-channel FMCW system, for measuring the distance from the object. A separate distance measurement from the object can therefore be performed for each light source. In this respect, the distance measurement in particular takes place from the respective irradiation point currently used for the light source. The single-channel FMCW systems can furthermore also be configured to perform a radial speed measurement and/or a polarization-dependent intensity measurement based on transmission light reflected by the object.

An FMCW system is a system that emits a frequency modulated continuous wave (FMCW for Frequency Modulated Continuous Wave).

Accordingly, in an FMCW system, the transmission light beam is frequency modulated, wherein the transmission light beam repeatedly passes through a predetermined frequency deviation while it is irradiated into the field of view of the sensor. The frequency of the transmission light thus changes constantly. If transmission light reflected by an object is now detected by a detector of the optoelectronic sensor, the reflected transmission light has a different frequency than the transmission light just transmitted at the time of reception due to the time of flight. The distance from the object can then be determined from this frequency difference.

To enable a distance measurement that is fast and as accurate as possible, a frequency deviation of, for example, 20, 100, or even 200 GHz can be passed through within a modulation time duration of, for example, 2, 5, or 10 μs. The frequency deviation can, for example, be produced in that the wavelength of the optical radiation of the transmission light is changed e.g. starting at a lower frequency up to an upper frequency (or vice versa) in the modulation time duration. The difference between the currently transmitted frequency and the frequency of the received reflected transmission light can, for example, be determined by mixing the reflected transmission light with a portion of the currently generated transmission light.

In accordance with a further embodiment, the transmission light reflected by the object is coupled into the photonic network at the irradiation points and is supplied to the detector by means of the photonic network, wherein a separate detector is preferably present for each light source. The reflected transmission light can use the same light path through the photonic network as the transmission light of the respective light source. The reflected transmission light can, in particular via a circulator or by means of other devices, be decoupled from the light path, separated from the transmission light, and supplied to the detector. The circulator can in particular be arranged between the respective light source and the first optical switch of the photonic network.

Alternatively, the reflected transmission light can be supplied to the detector via separate optics that are not used by the transmission light. Further alternatively or additionally, the reflected transmission light and the transmission light can be distinguished based on the polarization. In this way, the reflected transmission light can be supplied based on its polarization to separate optics not used by the transmission light and finally to the detector.

In accordance with a further embodiment, at least the first and the second light source use different wavelengths and/or different wavelength ranges for the transmission light. All the light sources can in particular also use different wavelengths and/or different wavelength ranges for the transmission light. The wavelengths and/or the cutoff wavelengths of the wavelength ranges can, for example, differ by at least 0.1%, 1%, 5%, or 10%. The wavelengths used by the light sources can in particular differ from one another at the point in time of the generation of the transmission light. Nevertheless, a first light source can, for example, use a wavelength at a later point in time that was already used by a second light source at an earlier point in time. Due to the different wavelengths, "cross-talk" in waveguide intersections can be minimized. Furthermore, false detections of reflected transmission light of other light sources can be reduced.

In accordance with a further embodiment, at least one of the irradiation points, preferably each of the irradiation points, is coupled to an optical amplifier. The optical amplifier can, for example, be an SOA (Semiconductor Optical Amplifier). Due to the optical amplifier, losses in the photonic network can be compensated before the transmission light is irradiated from the irradiation points into the partial fields of view.

A further subject of the invention is a method of operating an optoelectronic sensor that serves to detect an object in a field of view of the sensor, wherein a first and a second light source generate transmission light, wherein the light sources emit transmission light to a photonic network, wherein the transmission light is supplied to a plurality of irradiation points of the photonic network, wherein the transmission light preferably exits from the irradiation points, possibly into the transmission optics, in particular ultimately into the field of view, wherein transmission light is irradiated from a plurality of irradiation points that are arranged directly next to one another or that are directly adjacent into partial fields of view, in particular different partial fields of view and/or a plurality of partial fields of view, that are adjacent and/or that are arranged next to one another, preferably directly adjacent or arranged directly next to one another, at least one detector detects transmission light reflected by the object.

The method in accordance with the invention is characterized in that transmission light of the second light source is supplied to at least one irradiation point that is disposed between two irradiation points to which transmission light of the first light source can be supplied.

In accordance with an embodiment of the method, the optoelectronic sensor at least also comprises a third light source, wherein transmission light of the first, second and third light source, in particular at the same time, is supplied, preferably simultaneously supplied, to three irradiation points arranged directly next to one another and is irradiated into three partial fields of view arranged directly next to one another. With four light sources, four irradiation points arranged directly next to one another can accordingly be used. With even more light sources, the disclosure applies accordingly.

By using a plurality of irradiation points arranged directly next to one another, a simultaneous or temporally overlapping scanning of the different partial fields of view can take place, whereby detailed information about the object and the distance of the object in different partial fields of view can be acquired within a short time.

The aforementioned emission of transmission light from at least three irradiation points arranged directly next to one another can also be preceded by a rough scan in order to first roughly detect the position of the object. For this purpose, transmission light of the different light sources can be supplied to irradiation points that are each spaced apart from other currently active irradiation points by at least one or more other irradiation points. For example, exactly one irradiation point can be used in each of the groups explained above, wherein transmission light of different light sources is used for the different groups. If the rough position of the object is then known, the light sources can then be switched to irradiation points arranged directly next to one another in order to irradiate transmission light into partial fields of view in which the object can be provisionally detected.

The statements made with respect to the optoelectronic sensor in accordance with the invention apply accordingly to the method in accordance with the invention; this in particular applies with respect to advantages and embodiments.

The invention will be described purely by way of example with reference to the drawings in the following. There are shown:

FIG. 1 an optoelectronic sensor and an object in the field of view in a schematic view;

FIG. 2 light sources of the optoelectronic sensor of FIG. 1 and a photonic network;

FIG. 3 an optical switch;

FIG. 4 a waveguide intersection; and

Figure 5:
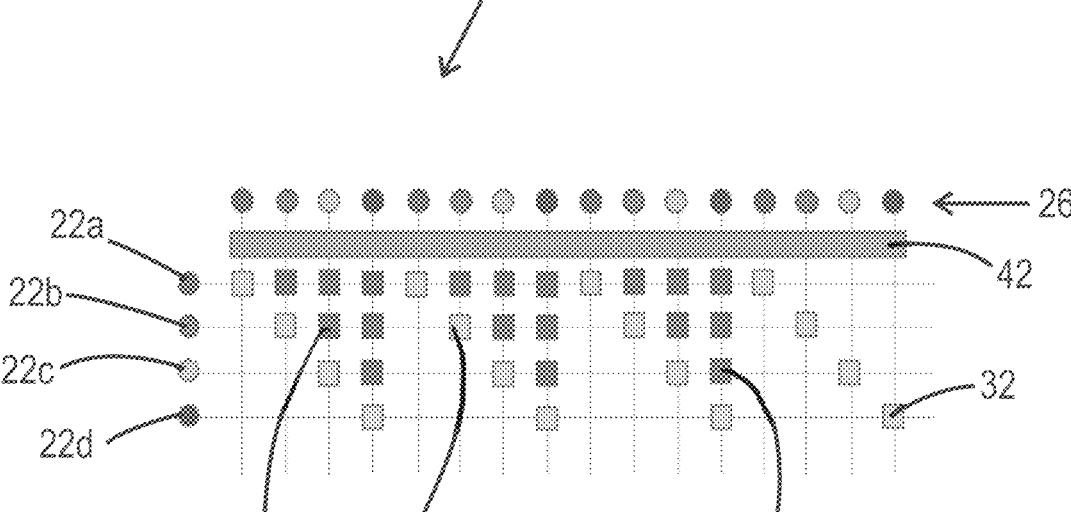

FIG. 5 an alternative form of representation of the photonic network.

FIG. 1 shows an optoelectronic sensor 10 that emits transmission light 12 into a field of view 14.

An object 16 onto which the transmission light 12 is incident and is reflected back is located in the field of view 14. This reflected transmission light 18 returns to the sensor 10 and is detected there by a detector (not shown). Due to the detection of the reflected transmission light 18, the distance between the sensor 10 and the object 16 can be calculated by determining the time of flight.

The optoelectronic sensor 10 comprises a control device 20 that, for example, performs the determination of the distance between the sensor 10 and the object 16. The control device 20 comprises four single-channel FMCW systems (not shown), each having a light source 22. The light sources 22 of the single-channel FMCW systems are controlled by the control device 20. In FIG. 1, only exit points of the light sources 22 are schematically shown.

The light sources 22 emit transmission light 12 to a photonic network 24 at the exit points. The transmission light 12 is selectively supplied to different irradiation points 26 by the photonic network 24. From the irradiation points 26, the transmission light 12 moves through transmission optics configured as a lens 28 into the field of view 14. From each irradiation point 26, only one partial field of view 30 can be irradiated with transmission light 12 and can thus be optically sensed.

The details of the photonic network 24 are shown in FIG. 2. In FIG. 2, the four light sources 22 are shown in more detail as the first light source 22a, the second light source 22b, the third light source 22c, and the fourth light source 22d. An optical switch 32 of a first stage 34 is directly coupled to each of the light sources 22.

As FIG. 3 shows, each optical switch 32 comprises an input E1 and two outputs A1, A2. Transmission light arriving at the input E1 can selectively, for example controlled by the control device 20, exit only from the output A1 or only from the output A2.

Waveguide intersections 36 are connected to the outputs A1, A2 of the optical switches 32.

As shown in FIG. 4, the waveguide intersections 36 comprise two inputs E1, E2 and two outputs A1, A2. In this respect, the input E1 and the output A1 as well as the input E2 and the output A2 are each disposed diagonally opposite one another so that the desired intersection effect results. Transmission light supplied into the input E1 only exits again at the output A1. Transmission light arriving at the input E2 only exits again at the output A2.

The six waveguide intersections 36 of the first stage 34 are arranged such that the light paths resulting from the two outputs A1, A2 of each individual switch 32 intersect at least one output (or the corresponding light paths) of each other switch 32 of the first stage 34 once. If, for example, the switch 32 directly connected to the light source 22d is considered, the output A1 (the upper one in the Figure) is connected to one waveguide intersection 36 and the output A2 (the lower one in the Figure) is connected to two waveguide intersections. The upper output A1 of the switch 32 thereby intersects the lower output A2 of the uppermost switch 32 in the Figure and the lower output A2 of the switch 32 intersects the two upper outputs A1 of the two lower switches 32 of the first stage 34.

Overall, eight outputs or output paths thus result for the first stage 34 and are coupled to optical switches of a second stage 38. The outputs of the switches 32 of the second stage 38 are each connected to a total of seven waveguide intersections 36 so that the outputs of one switch 32 of the second stage 38 intersect at least one output of each other switch once.

Thus, after the second stage 38, sixteen outputs are present that are supplied to sixteen irradiation points 26. The sixteen irradiation points 26 are divided into four groups 40, wherein, in each group 40, each of the irradiation points 26 can be associated with another light source 22. The irradiation points 26 which can be associated with the first light source 22a and to which transmission light 12 of the first light source 22a can accordingly be supplied are marked by 1.x in the Figure. The irradiation points 26 that can be associated with the second light source 22b are marked by 2.x in a corresponding manner. Irradiation points of the first group 40 are designated by x.1; irradiation points of the second group are designated by x.2. The designation takes place accordingly for the further light sources 22c, 22d and the further groups 40.

Due to the waveguide intersections, it is possible that, between two different irradiation points 26 to which transmission light of the same light source 22 can be supplied, an irradiation point 26 is in each case arranged for each other light source 22, to which irradiation point 26 transmission light 12 of one of the other light sources 22 can be supplied.

The irradiation points 2.2, 3.2, 4.2, 1.3, 2.3, and 3.3 can in particular each have a smaller spacing from one another than the other irradiation points. In this way, an increased resolution can be centrally achieved in the field of view 14.

In FIG. 2, the arrangement of the photonic network 24 is represented in the manner in which the switches 32 and the waveguide intersections 36 could be spatially arranged in a photonic integrated circuit. Another manner of representation of the photonic network 24, namely as a matrix circuit, is shown in FIG. 5. The photonic network 24 of FIG. 5 differs from the photonic network 24 of FIG. 2 only by an optical amplifier 42. It is understood that a separate optical amplifier 42 could also be provided for each irradiation point 26.

In the operation of the optical sensor 10, the four light sources 22 can first perform a rough scan, wherein, for example, the irradiation points 1.1, 2.2, 3.3, and 4.4 are used. If it is then determined based on the reflected transmission light 18 that the object 16 is located in partial fields of view 30 that belong to irradiation points 26 of the second group 40, the optical switches 32 can then be set such that all the light sources 22 simultaneously emit transmission light into the field of view 14 via the irradiation points 26 of the second group (i.e. the irradiation points 1.2, 2.2, 3.2, and 4.2). The object 16 can then be detected very quickly and very accurately.

REFERENCE NUMERAL LIST 10 optoelectronic sensor
12 transmission light
14 field of view
16 object
18 reflected transmission light
20 control device
22 light sources
24 photonic network
26 irradiation point
28 lens
30 partial field of view
32 optical switch
34 first stage
36 waveguide intersection
38 second stage
40 group
optical amplifier

What is claimed is:

1. An optoelectronic sensor for detecting an object in a field of view of the sensor, said optoelectronic sensor comprising
    a plurality of light sources for generating transmission light, wherein the light sources comprise at least a first and a second light source
    a transmission optics for projecting transmission light into the field of view at least one detector for detecting transmission light reflected by the object wherein the light sources emit transmission light to a photonic network wherein the photonic network has a plurality of irradiation points to each of which transmission light can be supplied, wherein a plurality of irradiation points that are arranged directly next to one another or that are directly adjacent are configured to irradiate transmission light into a plurality of partial fields of view that are arranged next to one another or that are adjacent, wherein the photonic network is configured to supply transmission light of the same light source to at least two different irradiation points, wherein, between the two different irradiation points to which transmission light of the first light source can be supplied, at least one irradiation point is arranged to which transmission light of the second light source can be supplied.

2. The optoelectronic sensor in accordance with claim 1, wherein the transmission light can be supplied to the plurality of irradiation points in each case from exactly one light source.

3. The optoelectronic sensor in accordance with claim 1, wherein the plurality of partial fields of view are arranged directly next to one another or directly adjacent to one another.

4. The optoelectronic sensor in accordance with claim 1, wherein the photonic network comprises at least one optical switch for each light source, wherein the respective switch is configured to feed transmission light to at least two different light paths in the photonic network in order to supply transmission light to at least two different irradiation points.

5. The optoelectronic sensor in accordance with claim 1, wherein the photonic network comprises at least one waveguide intersection to supply transmission light of the second light source to the irradiation point that is disposed between the two different irradiation points to which transmission light of the first light source can be supplied.

6. The optoelectronic sensor in accordance with claim 1, wherein the sensor comprises at least three, four or more than four light sources, wherein, between two different irradiation points to which transmission light of the same light source can be supplied, an irradiation point is in each case arranged for each other light source, to which irradiation point transmission light of one of the other light sources can be supplied.

7. The optoelectronic sensor in accordance with claim 1, wherein the photonic network has a photonic integrated circuit.

8. The optoelectronic sensor in accordance with claim 7, wherein the photonic integrated circuit has the optical switch and the waveguide intersection.

9. The optoelectronic sensor in accordance with claim 1, wherein the irradiation points are arranged along a straight line.

10. The optoelectronic sensor in accordance with claim 1, wherein the optoelectronic sensor has a group of irradiation points arranged directly next to one another, wherein the number of irradiation points in the group corresponds to the number of light sources, wherein transmission light of another light source can be supplied to each of the irradiation points in the group.

11. The optoelectronic sensor in accordance with claim 10, wherein a plurality of groups are arranged following one another.

12. The optoelectronic sensor in accordance with claim 1, wherein some of the irradiation points are configured to irradiate transmission light into partial fields of view arranged more closely next to one another.

13. The optoelectronic sensor in accordance with claim 1, wherein the optoelectronic sensor is configured to supply transmission light to some of the irradiation points for a longer period of time than to other irradiation points to which transmission light is supplied.

14. The optoelectronic sensor in accordance with claim 1, wherein the photonic network comprises a first stage having optical switches and waveguide intersections, wherein the optical switches each have one input and two outputs, wherein the outputs of each switch are connected to a plurality of waveguide intersections so that the outputs of one switch intersect at least one output of each other switch once.

15. The optoelectronic sensor in accordance with claim 14, wherein the photonic network comprises a second and/or one or more further stages having optical switches and waveguide intersections, wherein the optical switches each have one input and two outputs, wherein the outputs of each switch are connected to a plurality of waveguide intersections so that the outputs of one switch intersect at least one output of each other switch once, wherein a respective optical switch of the second and/or further stage is provided for an output of the previous stage.

16. The optoelectronic sensor in accordance with claim 1, wherein each light source is part of an FMCW system for measuring the distance from the object.

17. The optoelectronic sensor in accordance with claim 16, wherein each light source is in each case a single-channel FMCW system.

18. The optoelectronic sensor in accordance with claim 1, wherein the transmission light reflected by the object is coupled into the photonic network at the irradiation points and is supplied to the detector by means of the photonic network.

19. The optoelectronic sensor in accordance with claim 18, wherein a separate detector is present for each light source.

20. The optoelectronic sensor in accordance with claim 1, wherein at least the first and the second light source use different wavelengths and/or wavelength ranges for the transmission light.

21. A method of operating an optoelectronic sensor that serves to detect an object in a field of view of the sensor, wherein a first and a second light source generate transmission light, wherein the light sources emit transmission light to a photonic network, wherein the transmission light is supplied to a plurality of irradiation points of the photonic network, wherein transmission light is irradiated from a plurality of directly adjacent irradiation points into a plurality of partial fields of view arranged directly next to one another, at least one detector detects transmission light reflected by the object, wherein transmission light of the second light source is supplied to at least one irradiation point that is disposed between two irradiation points to which transmission light of the first light source can be supplied.

22. The method in accordance with claim 21, wherein the optoelectronic sensor at least also comprises a third light source, wherein transmission light of the first, second and third light source is supplied to three irradiation points arranged directly next to one another and is irradiated into three partial fields of view arranged directly next to one another.

23. The method in accordance with claim 22, wherein transmission light of the first, second and third light source is simultaneously supplied to three irradiation points.

* * * * *